United States Patent [19]
Nishimura

[11] Patent Number: 5,855,249
[45] Date of Patent: Jan. 5, 1999

[54] ELECTRIC VEHICLE FOR URBAN USE

[75] Inventor: Shiro Nishimura, Pompéìa, Brazil

[73] Assignee: Maquinas Agricolas Jacto S.A., Pompeia, Brazil

[21] Appl. No.: 763,968

[22] Filed: Dec. 10, 1996

[30] Foreign Application Priority Data

Jul. 11, 1996 [BR] Brazil ................................. 9601936-0

[51] Int. Cl.⁶ .................................................. B62D 61/06
[52] U.S. Cl. ...................... 180/214; 180/65.5; 310/67 R
[58] Field of Search ................................... 180/211, 214, 180/65.5, 68.5, 65.6; 310/67 R

[56] References Cited

U.S. PATENT DOCUMENTS

| 1,155,123 | 9/1915 | Barton | 180/65.5 X |
|---|---|---|---|
| 3,289,780 | 12/1966 | Ferris | 180/214 |
| 3,572,455 | 3/1971 | Brueske | 180/214 |
| 3,930,552 | 1/1976 | Kunkle et al. | 180/68.5 |
| 3,989,118 | 11/1976 | Hansen | 180/68.5 |
| 4,558,263 | 12/1985 | Harris et al. | 180/211 X |
| 5,163,528 | 11/1992 | Kawamoto et al. | 180/65.5 |
| 5,207,288 | 5/1993 | Ono | 180/65.5 X |
| 5,560,442 | 10/1996 | Canderle | 180/65.5 |
| 5,633,544 | 5/1997 | Toida et al. | 180/65.6 X |

*Primary Examiner*—Robert J. Oberleitner
*Assistant Examiner*—Pamela J. Lipka
*Attorney, Agent, or Firm*—Michael J. Striker

[57] ABSTRACT

A motor vehicle for urban use has a chassis, a plurality of wheels mounted on the chassis, an electric motor, an electric energy source supplying current to the electric motor located inside one of the wheels, and gears including a conical gear provided on an axle of the electric motor and a circular gear provided in a casing, with a roller bearing received in a groove of the circular gear.

9 Claims, 3 Drawing Sheets

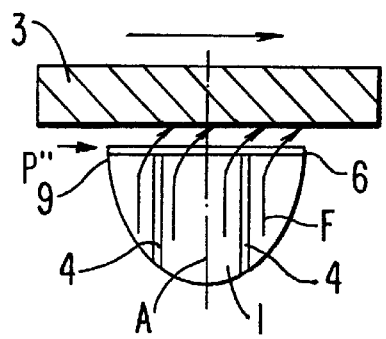
FIG.1.1
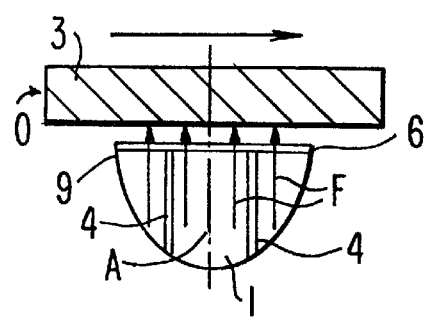
FIG.1.2
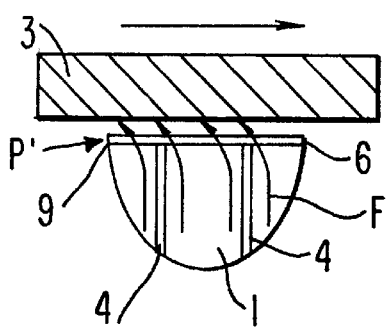
FIG.1.3
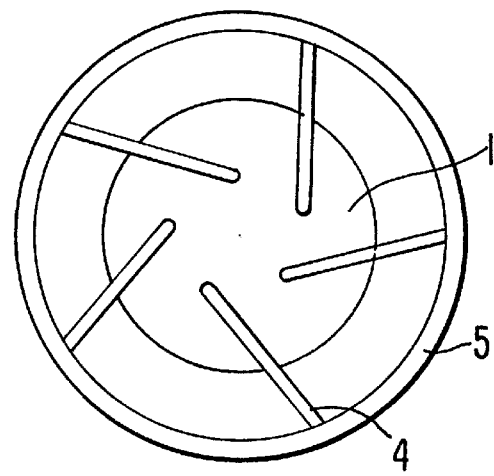
FIG.3
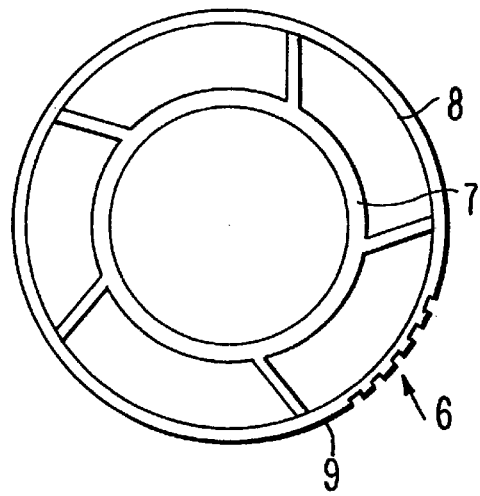
FIG.4

ELECTRIC VEHICLE FOR URBAN USE

BACKGROUND OF THE INVENTION

The present invention relates generally to motor vehicles, and in particular to a small size electric vehicle for urban use.

It is well known that big urban centers have been growing and the number of inhabitants has been increasing uncontrollably in recent years. One of the biggest problems of big cities is transportation. With traffic jams in the big cities the number of accidents of personal vehicles increases, it is difficult to provide services to local people, and serious problems to the urban society arise. It is therefore an urgent issue to provide in big cities an efficient transportation system for simple and fast movement of people, as well as mail delivery, distribution of products, medical services, local traffic, police work, etc.

It is known to use motorcycles as small size motor vehicles for urban use. However, the motorcycles have a lot of inconvenience, such as high degree of noise, pollutions, and increased risk of accidents for drivers and pedestrians. Also, the use of internal combustion engines, in addition to the above mentioned problems, deplete natural resources.

SUMMARY OF THE INVENTION

Accordingly, it is an object of the present invention to provide a small size motor vehicle, which avoids the disadvantages of the prior art.

In keeping with these objects and with others which will become apparent hereinafter, one feature of the present invention resides, briefly stated, in a small size motor vehicle which has a chassis, a plurality of wheels mounted on the chassis for supporting the same, an electric motor, an electric energy source for current supply of the electric motor, means for controlling the operation of the motor, wherein the motor is arranged inside of one of the wheels of the vehicle.

When the motor vehicle is designed in accordance with the present invention, it avoids the disadvantages of the prior art and provides for highly advantageous results.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1.1–1.3 is a side view of a small size motor vehicle for urban use in accordance with the present invention;

FIG. 3 is a partial perspective view of a rear part of the motor vehicle in accordance with the present invention with a rear door open and a set of electrical batteries taken off.

FIG. 4 is a side view of a front wheel of the motor vehicle in accordance with the present invention without a cover, on an enlarged scale.

DESCRIPTION OF PREFERRED EMBODIMENTS

Figure 2:
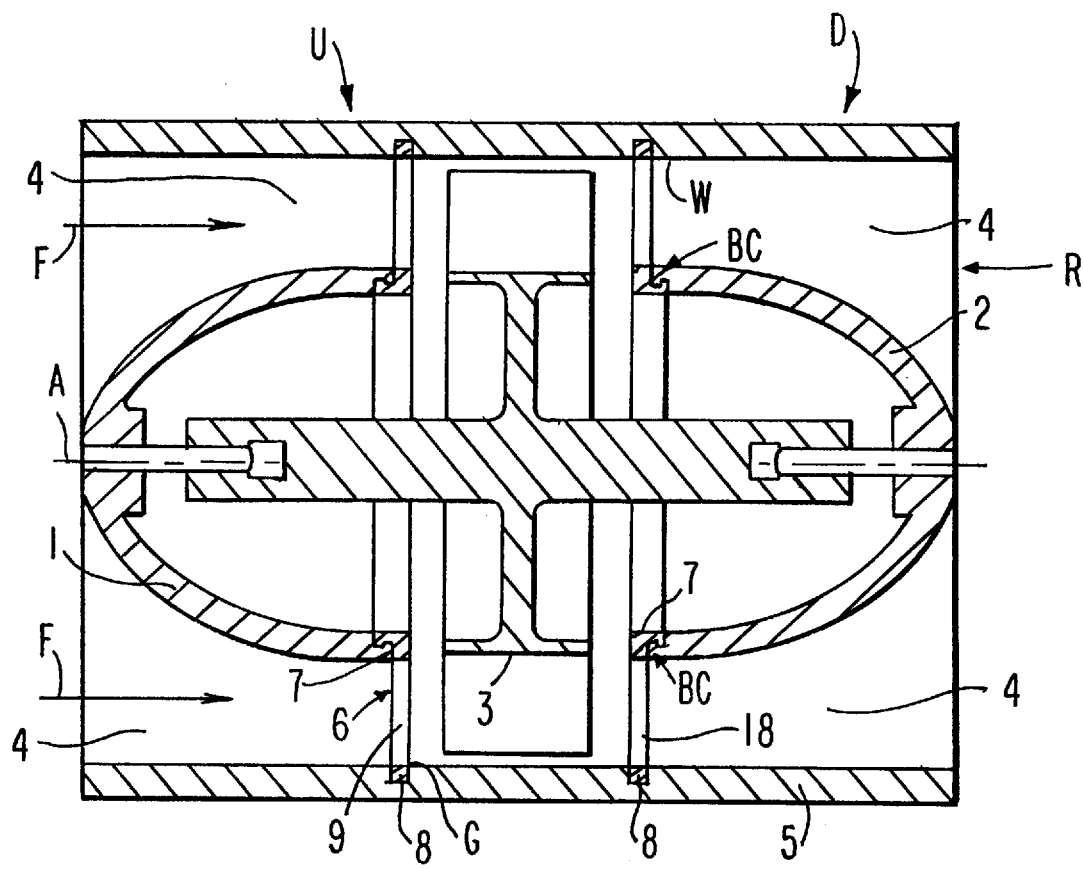
FIG. 2 is a plan view of the inventive motor vehicle shown in FIG. 1.
Figure 5:
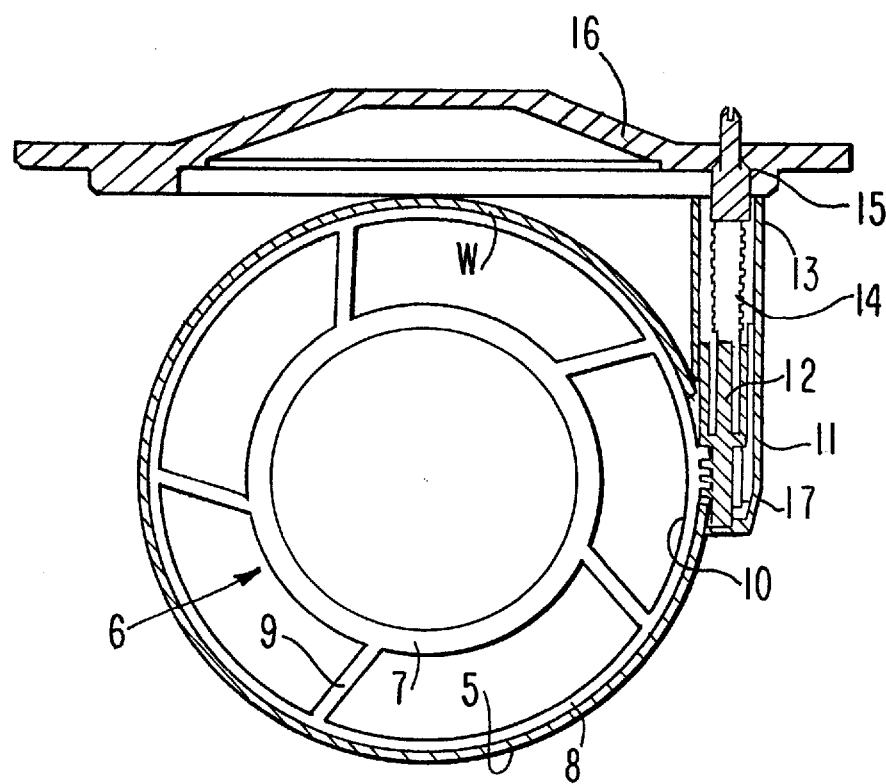
FIG. 5 is a view showing a section of the front wheel of the inventive motor vehicle of FIG. 4.

A small size motor vehicle in accordance with the present invention is designed generally for urban use and identified as a whole with reference numeral 1. The motor vehicle has a front wheel 2 mounted on a frame which can be formed as a motorcycle-type handlebar fork-type frame provided with a handlebar 3. The motor vehicle further has two rear wheels 4, and a wedge-shaped body with side parts 5 for user feet rest 5 as can be seen from FIG. 2. The body of the motor vehicle has an internal prismatic and longitudinal chamber 6 which extends substantially from the front wheel 2 to a space between the rear wheels 4. A support box 7 is located in the chamber 6 and accommodates a plurality of electrical batteries 8. A rear door 9 opens upwards so as to open the chamber 6 or close the chamber correspondingly. In order to maintain the central gravity of the vehicle 1 as low as possible, the chamber 6 which receives the support box 7 with the batteries 8 is placed in the lowest vehicle portion.

The chamber 6 is provided with rails 10 which receive wheels 11 mounted on the support box 7. Thereby a loading of the batteries into the vehicle and unloading the batteries from the vehicle is facilitated. In addition to the foot supporting side parts 5, the wedge-shaped body has an elevated portion 12 with a shape conforming to the shape of the support box 7 for the batteries 8.

FIG. 3 shows the motor vehicle 1 with the rear door 9 open and the support box 7 with batteries 8 removed. For facilitating loading and unloading of the batteries, a liftable wheeled cart 13 with wheels 13a is provided. The cart 13 aligns the wheels 11 of the support box 7 with the rails 10, so that the support box 7 can be rolled on the wheels 11 into the motor vehicle or out from it.

An electric motor 14 is mounted in the front wheel 2 and has an axle 15 extending radially. The wheel 2 has a light alloy metal casing 16 which forms an inner chamber 18 for the electric motor 14. The casing has a part 17 with a shape and dimensions selected to receive suitable tires for the wheel 2. The electric motor 14 is mounted inside a cylindrical body 19. The cylindrical body 19 surrounds almost the whole electric motor 14 and is composed of two halves which are connected with one another along a plane extending perpendicular to the wheel axis. The connection is performed by screws 20.

FIG. 4 shows the front wheel 2 which is open and does not have a front cover 24, so as to show the electric motor 14. The cylindrical body 19 has a plurality of ribs for heat dissipation. Each half of the cylindrical body 19 has a hollow axle 21 fixed to the frame 3 by nuts 22. The casing 16 of the wheel 2 is turnable freely on the axle 21 via roller bearing 23. The cover 24 which is also composed of light alloy metal has a bearing 25 for free turning of the hollow axial 21. The cover 24 is fixed to the casing 16 by bolts 26 and forms with the casing 16 a one-piece hollow frame for accommodating the electric motor 14.

The electric motor 14 has its own cover 27 arranged on an axle 30 with interposition of two roller bearings 28 and 29. The axle 30 is provided with a conical gear which is located between the roller bearings and engages with a circular conical gear 31 fixed to the casing 16. The circular gear 31 has a circular portion located between the teeth region and the casing 16 and provided with a circular groove 32 for receiving a roller bearing 33. The roller bearing 33 is arranged on the motor cover 27, and the groove 32 has a rectangular cross-section and a size selected to accommodate the roller bearing. The casing 16 and the cover 24 are provided with ribs 34 for structural reinforcement and heat dissipation.

The electric harness or connections of the electric motor extend from the motor through the hollow axle 21 to electrical controls located inside the chambers 6 through a fork-like wheel support 3'. The gears and roller bearings are oil-lubricated by oil supplied through a filler hole in the casing 16 and distributed to the corresponding bearings and gears through internal orifices. The oil is also used as a heat transfer element between the housing, the gears, the bearings and the housing ribs. The hollow axle 21 and the nut 22 are used for firm assembly of the cylindrical body 19 which contains the electric motor 14, to the fork-like wheels supports 3', to prevent a rotation between the parts. The bearings 23 and 25 on the other hand allow a free running of the casing 16 relative to the motor, so that when the motor gear turns, the circular gear 31 is turned, and therefore the wheel 2 is turned as well. The bearings 33 inside the groove of the gear 31 maintains the desired distance between the motor gear and the 31 to avoid damages due to mechanical stress in the teeth of these gears and also to avoid undesirable noise and premature wear.

The speed control of the motor, the brakes, the electrical components of the lights, the warning signs and monitoring are of the conventional type, and therefore they are not described in detail. The motor vehicle for urban use in accordance with the present invention has a low center of gravity because its greatest mass contained in the electrical batteries is located between the axles. In addition, the use of the front wheel drive in a single front wheel eliminates the use of a differential type axle, and excellent traction force is achieved in the front wheel due to the weight distribution resulted from the electric motor and a part of the battery pack over the front axle. Another advantage is that the transmission from the motor is composed of a single gear pair. The great speed ratio between the motor and the wheel is overcome by using a big diameter circular gear inside the only suitable place of the vehicle, or in other words, inside its wheel.

Since the electric motor is located inside the vehicle wheel, a great dissipation area is provided not only by both faces of the wheel, but also due to the radial wings which have extensive contact with surrounding air. This permits to provide a completely closed motor without a fan which runs free of contamination by dust and humidity. The removable support box with the batteries, cooperating with the inner rails and the outer liftable wheeled cart, is helpful for battery maintenance. Its major advantage is that it is possible to have a single support box in the vehicle while a spare is in charging procedure. The autonomy of the vehicle in this case will be limited to a specific zone of use. The vehicle also has an ergonomic body with a vertical wedge shape without any lateral and pertruding parts which could damage people. The inventive vehicle is easy to maintain, and one damaged front wheel can be exchanged by another to make the vehicle again ready for use. Since the wheel contains practically all traction mechanical components, repair work in the wheel can be done easily in a mechanical work bench with the wheel in the best and comfortable position. The back part of the vehicle can be provided with a double passenger seat or a volume container without affecting the vehicle equilibrium. Since the vehicle produces low noise and no pollution, it can be used in night time as well.

It will be understood that each of the elements described above, or two or more together, may also find a useful application in other types of constructions differing from the types described above.

While the invention has been illustrated and described as embodied in electric vehicle for urban use, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor vehicle for urban use, comprising a chassis; a plurality of wheels mounted on said chassis; an electric motor; an electric energy source supplying current to said electric motor, said electric motor being located inside one of said wheels, said wheels including three wheels with one front wheel and two rearwheels, said electric motor being mounted in said front wheel, said front wheel having a casing with a recess forming an inner chamber for accommodating said electric motor and with a concave portion for receiving a tire, said casing being composed of two parts spaced from one another in direction of an axis of said front wheel and connected with one another; means for connecting said parts with one another, each of said parts of said casing having an axially extending hollow axle; a fork-like frame supporting said hollow axles with interposition of roller bearings, said electric motor having a rotary axle extending substantially radially; a cover provided with said electric motor and supporting said axle; a wheel casing; gear means including a conical gear provided on said axle and a circular gear provided in said casing in engagement with said conical gear, said circular gear having a cylindrical portion with a circular groove with a rectangular section for receiving a roller bearing.

2. A motor vehicle as defined in claim 1, and further comprising means for controlling said electric motor.

3. A motor vehicle as defined in claim 1, wherein said front wheel is mounted in said fork-like frame.

4. A motor vehicle as defined in claim 1, wherein said casing is provided with a plurality of ribs for heat dissipation.

5. A motor vehicle as defined in claim 1, and further comprising a vehicle body having a wedge shape and two lateral portions forming a foot rest for a driver.

6. A motor vehicle as defined in claim 5, wherein said vehicle body has an internal longitudinal and prismatic chamber extending substantially from a front wheel to a space between rear wheels, said electrical energy source being formed by a plurality of batteries; and further comprising a support box formed so that it supports said plurality of batteries and is located in said chamber.

7. A motor vehicle as defined in claim 6, and further comprising a rear door which is movable between an open position in which it opens said chamber and a closed position in which it closes said chamber.

8. A motor vehicle as defined in claim 6, wherein said chamber for said support box of said batteries is located in a lowest part of the vehicle.

9. A motor vehicle as defined in claim 6, wherein said chamber is provided with rails for loading and unloading said support box with said batteries.

* * * * *